United States Patent [19]

Füssl

[11] Patent Number: 4,810,190
[45] Date of Patent: * Mar. 7, 1989

[54] METHOD AND APPARATUS CALCINING MINERAL RAW MATERIALS UTILIZING SOLID FUEL

[75] Inventor: Erwin Füssl, Zürich, Switzerland

[73] Assignee: Maerz Ofenbau AG

[*] Notice: The portion of the term of this patent subsequent to Sep. 15, 1998 has been disclaimed.

[21] Appl. No.: 310,876

[22] Filed: Oct. 13, 1981

Related U.S. Application Data

[63] Continuation-in-part of Ser. No. 90,057, Oct. 31, 1979, abandoned.

[30] Foreign Application Priority Data

Feb. 28, 1979 [CH] Switzerland .......................... 1964/79

[51] Int. Cl.[4] ................................. F27D 1/08
[52] U.S. Cl. ................. 432/95; 110/101 CC; 110/347; 423/175; 432/14
[58] Field of Search ............... 423/173, 175, 177, 637; 432/24, 25, 95, 96, 100, 79; 110/106, 347, 101

[56] References Cited

U.S. PATENT DOCUMENTS

| | | |
|---|---|---|
| 3,074,706 | 1/1963 | Schmid et al. |
| 3,941,557 | 3/1976 | Buchner .............................. 432/99 |
| 4,131,072 | 12/1978 | Lingl, Jr. et al. ................. 110/106 |
| 4,141,154 | 2/1979 | Buchner .............................. 432/26 |
| 4,250,816 | 2/1981 | Angevine et al. ................ 110/106 |
| 4,259,911 | 4/1981 | Jones ................................ 110/106 |
| 4,287,160 | 9/1981 | Van Zander ...................... 423/168 |
| 4,289,482 | 9/1981 | Fussel ............................... 432/96 |
| 4,313,386 | 2/1982 | Boldt et al. ...................... 110/106 |
| 4,315,735 | 2/1982 | Fussl et al. ....................... 423/175 |

FOREIGN PATENT DOCUMENTS

| | | | |
|---|---|---|---|
| 48-6397 | 2/1973 | Japan ................................ 432/96 |
| 50-28920 | 9/1975 | Japan ................................ 432/96 |

Primary Examiner—Edward G. Favors
Attorney, Agent, or Firm—Toren, McGeady & Associates

[57] ABSTRACT

Fine particulate solid fuel is utilized in the calcining or uniflow shaft of a uniflow regenerative shaft furnace having outlet openings of fuel lances of the furnace arranged with a uniform distribution over the cross-section of the furnace shaft in a horizontal plane between the preheating zone and the calcining zone of the furnace. The fuel feed is maintained constant with time by a dosing system through which fuel is supplied through feed lines to the fuel lances. Due to the uniform distribution of solid fuel which is accomplished, a calcined material is obtained which has a quality comparable to that which may be achieved through calcining with gaseous or liquid hydrocarbons.

17 Claims, 3 Drawing Sheets

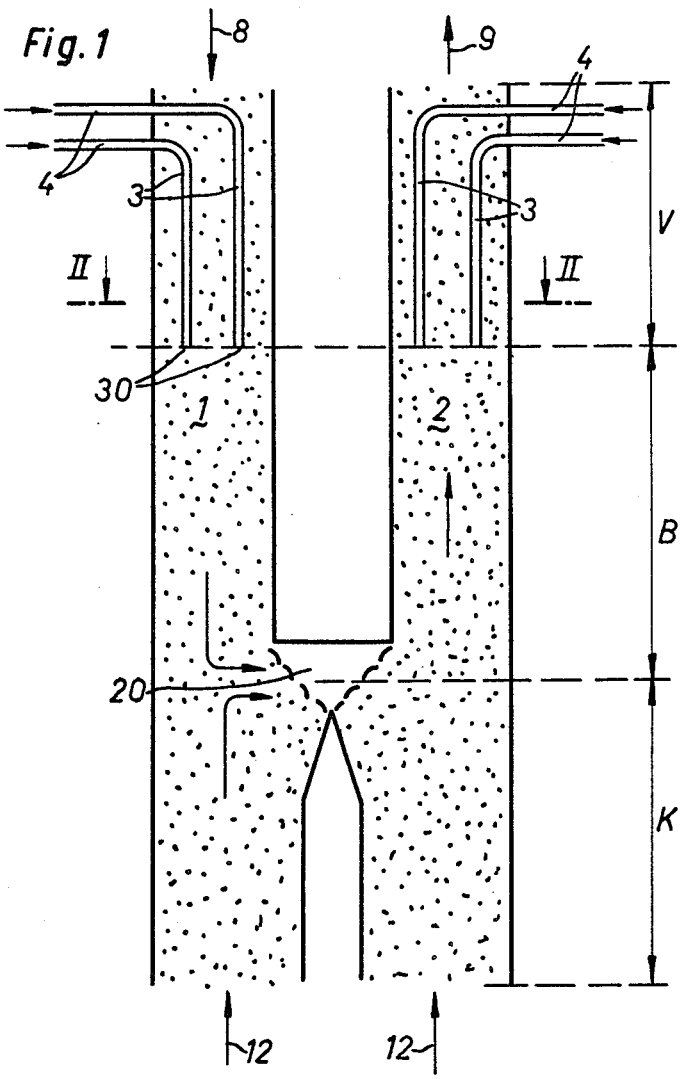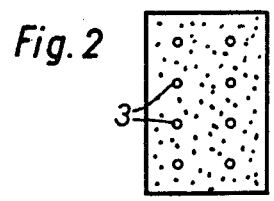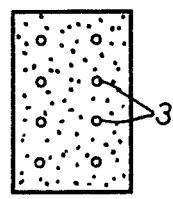

METHOD AND APPARATUS CALCINING MINERAL RAW MATERIALS UTILIZING SOLID FUEL

This is a continuation-in-part of copending application Ser. No. 090,057, filed Oct. 31, 1979, of Erwin Füssl for UNIFLOW REGENERATIVE SHAFT FURNACE FOR CALCINING LIMESTONE UTILIZING FUELS IN FINE PARTICULATE FORM.

The present invention relates generally to a process and apparatus for calcining limestone or similar raw material by utilizing fuels in solid or fine particulate form in a uniflow regenerative shaft furnace including at least one shaft which is operated as a combustion or uniflow shaft and wherein the fuel required for effecting the calcining operation is introduced through fuel outlets in the combustion or uniflow shaft.

Generally, a furnace of the type to which the present invention relates is provided with two shafts having a transfer duct connecting the shafts in flow communication with each other and wherein the shafts are alternately operated one as a calcining or uniflow shaft and the other as a counterflow shaft.

A regenerative process for calcining limestone and other similar mineral raw materials is known from U.S. Pat. No. 3,074,706. This process is frequently used in uniflow/counterflow shaft furnaces having two or more shafts. The process is relatively simple in operation and aside from low energy consumption, it also provides the significant advantage of being capable of optionally effecting soft burning as well as medium and hard burning. That is, with the process selected soft, medium and hard calcinations can be produced. In order to accomplish a high grade calcined product, it is usually required that the fuel be uniformly distributed over the cross-section of the furnace shaft and that it be supplied in amounts which are approximately uniform or constant over a given period of time.

These prerequisites may be accomplished with relative ease when gaseous or vaporized liquid fuels are utilized if the fuel is fed at several areas of the shaft cross-section.

It is also known to utilize carbon or coal dust in the calcination of limestone or similar materials in the annular furnaces or shaft furnaces. Such an approach is known from German Patent No. 945 378 and in this approach the coal dust is introduced at various levels of the calcining zone in order to accomplish a graded or step-wise combustion process. However, this type of fuel feed requires relatively high expenditures with regard to the pipelines which are required without accomplishing uniform distribution of the fuel over the cross-section of the furnace shaft.

The present invention is directed toward provision of a method and apparatus wherein the quality of the calcined lime or of the calcined material will be of a high degree approximately comparable to the quality which is achieved when the fuels utilized are gaseous or liquid hydrocarbons.

SUMMARY OF THE INVENTION

Briefly, the present invention may be described as a process and apparatus for calcining limestone and similar raw materials in a uniflow regenerative shaft furnace utilizing solid fuel wherein the solid fuel is introduced through fuel outlet means at the commencement of a calcining zone of the combustion or uniflow furnace and is applied in a uniformly distributed pattern over the cross-section of the shaft.

More specifically, the apparatus of the invention comprises fuel outlet openings which are provided at the end portions of fuel lances which are uniformly distributed over the cross-section of the shaft of the furnace. In a particular embodiment of the invention, the invention involves a process for calcining limestone and similar raw materials in a uniflow regenerative shaft furnace having at least two furnace shafts connected in flow communication by transfer duct means and alternatively operated in cycles, one as the calcining shaft and the other as the counterflow shaft, and utilizing solid fuel in fine particulate form. The improvement of the invention comprises that the fine particulate fuel is supplied in the calcining shaft in a uniform distribution across the cross-section of the shaft together with a gaseous carrier consisting of at least one of air and an inert gas through outlet openings for each of the furnace shafts which are all the vicinity of a common plane extending transversely to the longitudinal direction of the shafts, and that the fuel is subsequently supplied during the calcining cycle by means of a gaseous carrier in a continuous and uniformly distributed manner only at the common plane across the shaft cross-section.

The apparatus of the invention comprises a uniflow regenerative shaft furnace having at least two furnace shafts connected in flow communication by transfer duct means and alternately operated, one as the calcining shaft and the other as the counterflow shaft of the furnace, the furnace shafts being arranged to define a preheating zone and a calcining zone immediately adjacent each other with the termination of the preheating zone and the commencement of the calcining zone lying in a common plane extending transversely to the longitudinal direction of the shafts and means supplying solid fuel in fine particulate form in the calcining shaft of the furnace, said fuel supply means comprising fuel lances suspended in the preheating zone defining fuel outlet openings in communication with the calcining shaft uniformly distributed across the cross-sectional area of the shaft and arranged in the common plane between the preheating zone and the calcining zone for each of the shafts. The fuel lances may consist of an uninsulated simple metal pipe which is introduced into a hot region of the preheating zone and which may be supported by metallic, cooled burner means, the fuel supply means being the only means for supplying fuel to the furnace, and the fuel being thus exclusively supplied through the outlet openings at said common plane.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a schematic vertical sectional view of a uniflow regenerative shaft furnace having two furnace shafts wherein one shaft is operated as the combustion or uniflow shaft and the other shaft as the counterflow shaft;

FIG. 2 is a cross-section of the shafts taken along the line II—II in FIG. 1;

FIG. 3a is a view of the combustion shaft as seen when viewed in the direction A shown in FIG. 3.

DETAILED DESCRIPTION OF THE PREFERRED EMBODIMENTS

Figure 3:
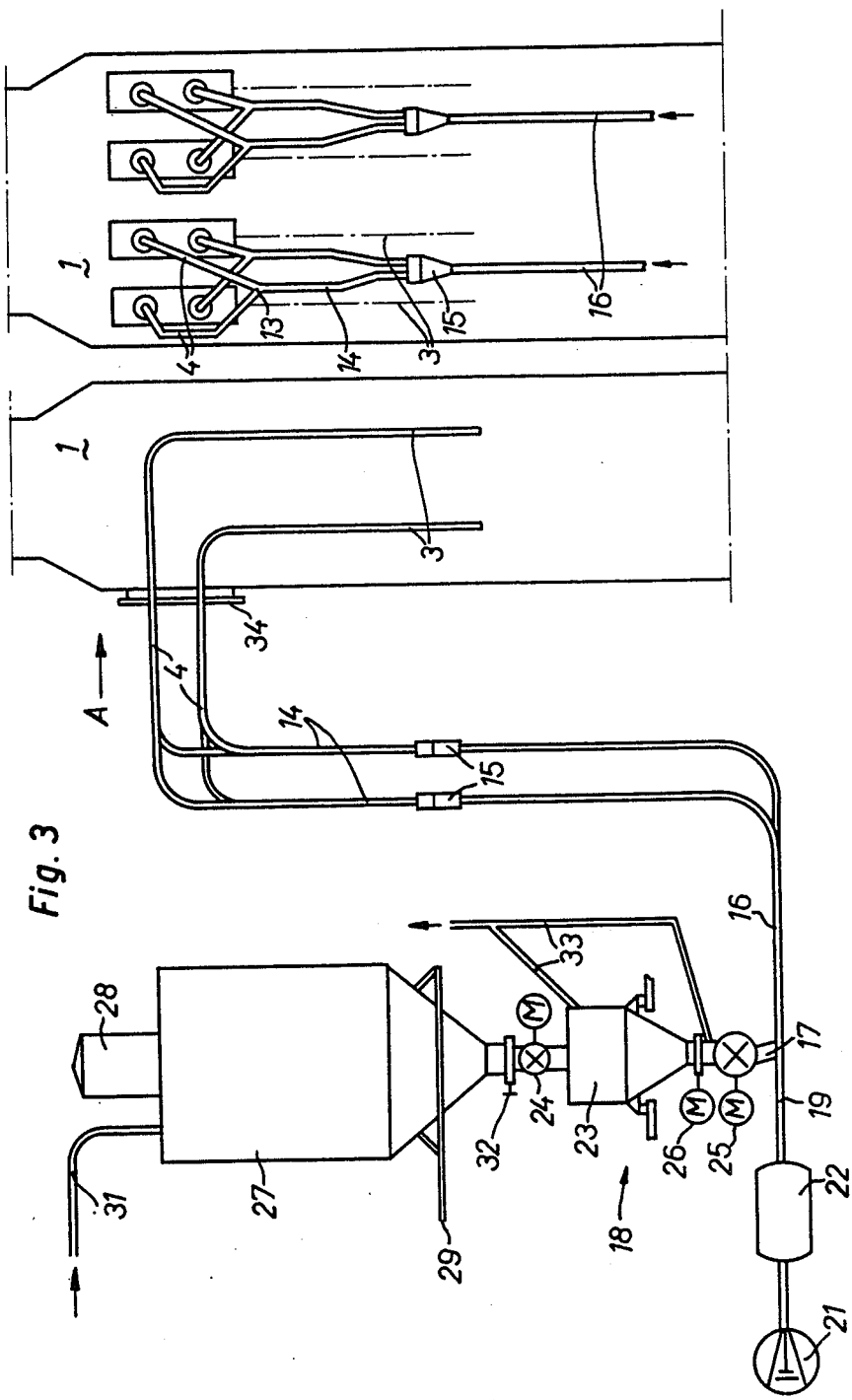
FIG. 3 is a schematic illustration of a system for a proportioning unit to feed fuel into the combustion shaft of the furnace.

Illustrated schematically in FIG. 1 is a shaft furnace of the type to which the present invention relates which includes two shafts 1 and 2 which are connected together in flow communication by a transfer duct 20. The furnace depicted in FIG. 1 is arranged so that the shafts may be alternately operated one as the combustion or uniflow shaft and the other as the counterflow shaft. In the arrangement shown in FIG. 1, the shaft 1 is considered to be the combustion or uniflow shaft and the shaft 2 the counterflow shaft.

The furnace is arranged so as to have defined in each of the shafts a preheating zone V, a calcining zone B, and a cooling zone K. It will be noted that the transfer duct 20 is located at the lower end of the calcining zone B.

In the operation of the furnace, combustion air is fed as indicated by the arrow 8 from the top of the shaft 1 and the fuel gases which develop during calcining in the shaft 1 are mixed during transition into the shaft 2 with cooling air which enters from the bottom as indicated by the arrows 12 and the gases leave the upper end of the shaft 2 as exhaust gases as indicated by the arrow 9 after having heated the material in the shaft 2.

After completion of a combustion phase, the process is reversed and the shaft 2 becomes the combustion or uniflow shaft and the shaft 1 becomes the counterflow shaft.

The furnace includes fuel supply means in the form of fuel lances 3 which are located in the upper sections of the shafts 1 and 2 in the preheating zone V. Fine particulate or dust-like solid fuel which may be, for example, carbon or coal dust, is utilized and it is supplied through the lances 3 into the combustion shaft of the furnace. The fuel is emitted into the combustion shaft of the furnace through fuel outlet openings 30.

The inlet of fuel into the fuel lances 3 occurs through feed pipes 4 which supply the powder-like solid fuel. In the counterflow shaft, which in the embodiment depicted in FIG. 1 is the shaft 2, the fuel lances 3 are cooled by means of a cooling medium, for example compressed air.

FIG. 2 is a cross-sectional view which shows the arrangement of the fuel lances 3. As will be evident from FIG. 2, the fuel lances 3 are arranged in a uniformly distributed pattern throughout the cross-section of the furnace shaft across which the lances 3 are located with the openings 30 lying in the vicinity of a transverse plane which defines the transition between the preheating zone V and the calcining zone B. The fuel lances 3 are arranged in two rows distributed through the rectangular cross-sectional configuration of the shafts. However, it will be apparent that with shafts having different cross-sectional shapes, a different pattern of distribution of the lances 3 may be utilized in order to maintain uniformity of the distribution. As a result of the arrangement of the present invention, solid fuel will be evenly distributed over the material to be calcined at the beginning of the calcining zone B and, thus, at the end of the calcining zone a uniformly calcined product will enter the cooling zone K.

As previously indicated, the present invention is not limited to utilization with shaft furnaces having square or rectangular cross-sectional configurations and the invention may be utilized with furnaces wherein the shaft cross section is polygonal, oval, or round and wherein the shafts are either arranged adjacent one another or concentrically one within the other. In the latter case, the outer shaft will be annular and the inner shaft cylindrical.

An important requirement for obtaining a qualitatively high grade calcined product is that the fuel be fed to the fuel lances in amounts which are approximately constant with time. The proportioning or metering units shown in FIGS. 3 and 4 serve this purpose. In the embodiment of the proportioning system of the invention shown in FIG. 3, the shaft 1 is shown schematically in section with FIG. 3a showing the exterior of the shaft 1 as viewed in the direction of the arrow A shown in FIG. 3. The fuel lances 3 located on the interior of the shaft 1 are supplied with fuel through infeed pipes 4 extending to the exterior of the shaft 1 with a pair of infeed pipes 4 being joined with a single pipe 14 at a branch point 13. Pairs of lines 14 are connected with one dosing line 16 by means of a division piece 15. At the upstream end of the dosing lines 16 there is provided a propelling nozzle 17 which is connected on one side thereof with fuel dosing means 18 with the other side of the nozzle 17 being connected with a propellant gas line 19. A compressor 21 is connected by means of a pressure vessel 22 with the propellant gas line 19.

The fuel dosing means 18 comprises a weighing vessel 23, a feed sluice 24 on the inlet side of the vessel 23, two dosing sluices 25 on the outlet side of the vessel 23, and a slide valve 26. The sluices 24 and 25 are shown as motor-driven bucket wheel sluices wherein the two dosing sluices 25 result by subdividing the bucket wheel of a bucket wheel sluice.

Above the weighing vessel 23 there is provided a fuel silo 27 which may, for example, contain coal dust, the silo 27 being arranged with its outlet at the lower end thereof connected with the feed sluice 24. On the cover of the silo 27 there is provided a ventilator 28 with a filter which connects the interior of the silo with the outside air. In order to prevent adherence of the solid fuel to the parts of the apparatus, a loosening device 29 is provided in the bottom portion of the silo 27. This loosening device prevents bridging formations of solid fuel in the silo 27 and ensures uniform flow of fuel into the feed sluice 24. The loosening device comprises an arrangement of lines by means of which a gas, preferably carbon dioxide, is blown into the interior of the silo. However, the loosening device of the system could also be of a mechanical construction and could, for example, comprise jolters or vibrators.

The silo 27 is refilled by means of a refill line 31, for example by compressed air conveyance. The outlet of the silo 27 may be blocked with a slide valve 32. Ventilating lines 33 operate to ventilate the weighing vessel 23 and they are advantageously guided into the silo 27.

The fuel lances 3 which are arranged in the shaft 1 can be installed and removed by means of a schematically illustrated mounting plate 34 in order, for example, to allow inspection of the condition of the fuel lances.

Figure 4:
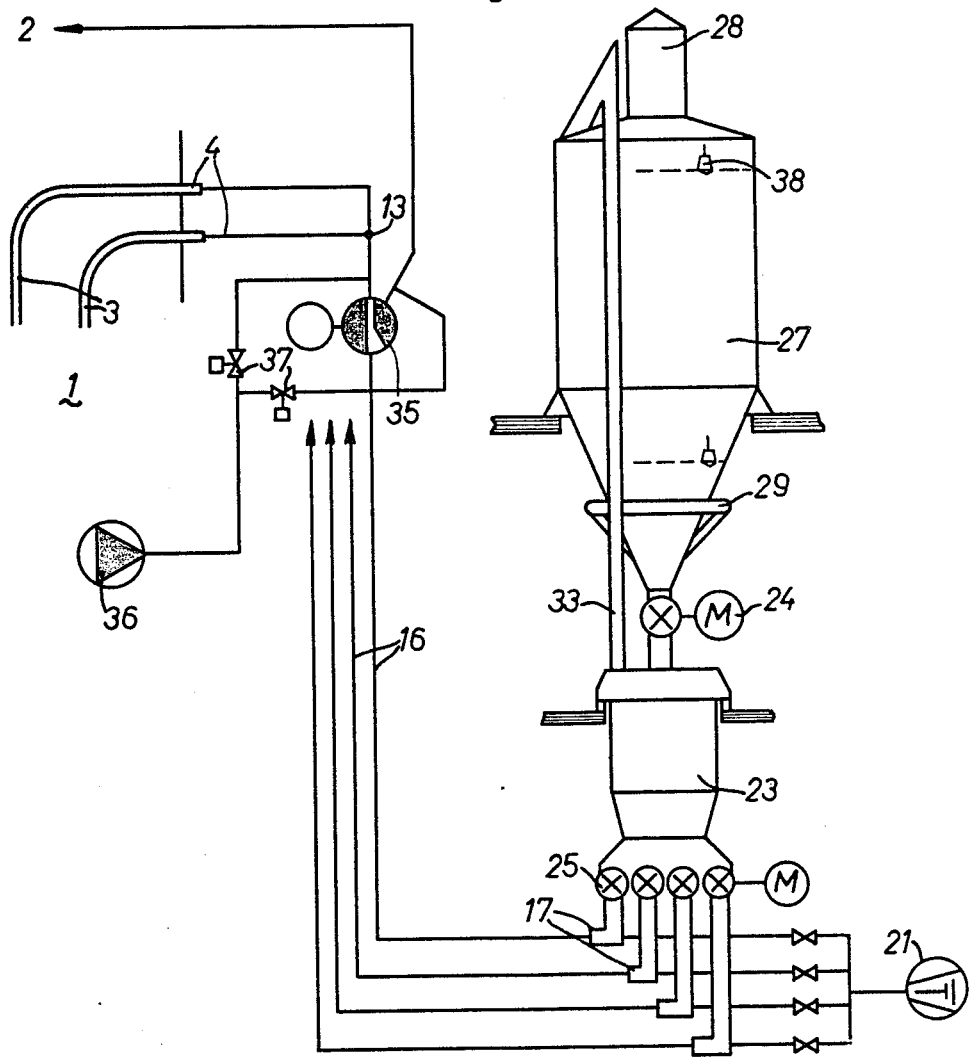
FIG. 4 is a schematic illustration of a modification of the proportioning system for feeding fuel into the combustion shaft of the furnace.

Another proportioning unit similar to that shown in FIG. 3 is shown in FIG. 4. Accordingly, in FIG. 4 parts similar to those shown in FIG. 3 are identified with the same reference numerals. However, unlike FIG. 3, the unit in FIG. 4 is provided with four dosing lines 16 which extend in branched connection with two feed lines 4. Before each of the branched connections 13 there is provided a tube switch 35 whereby a respective dosing line 16 can be switched into communication with two appropriate fuel lances 3 of the shaft operating as the combustion shaft. A shaft blower 36 serves to cool the fuel lances 3 which are located in the shaft operating as the counterflow shaft by blowing cooling air thereinto in order to prevent the temperature from rising to or above the coking point of the coal. By means of shutoff valves 37 the cooling air may be fed to the lances of either shaft 1 or 2.

As is evident from FIG. 4, four dosing sluices 25 are needed for eight fuel lances and these can be advantageously obtained by subdividing a larger bucket wheel sluice.

In the operation of the proportioning units according to FIGS. 3 and 4, first the solid fuel which may be coal dust is fed through the feed sluice 24 into the weighing vessel 23 until the required amount is obtained. The dosing sluices are placed in operation at the beginning of the combustion process and simultaneously propellant gas is fed in a desired amount from the compressor 21 to the four propelling nozzles 17. Since the fuel as well as the propellant gas are dosed or metered, fuel is fed to the fuel lances in an amount which is constant over a given period of time. After completion of the combustion process, the weighing vessel 23 is again filled with a desired amount of fuel and after changing the tube switch 35 the combustion process may commence again in shaft 2.

Subsequently, the combustion process may be alternately repeated in shafts 1 and 2. The fuel silo 27 is under surveillance by means of a critical value signal generator 38 so that there will always be sufficient fuel in the silo 27.

Industrial combustion tests were performed in a twin-shaft furnace having a shaft cross-sectional area of 3.8 $m^2$ and with a calcining zone height of 7.0 m. The grain range of the limestone was found to be between 30 and 90 mm wherein during the combustion period shaft 1 was always fired with coal dust and shaft 2 with natural gas. The lowest heating power of the natural gas was 8700 kcal equivalent to 36540 $kJ/m^2$. The eight fuel lances 3 distributed in the shaft 1 as shown in FIG. 2 were acted upon with a proportioning unit of the type shown in FIG. 3 and as described above. Shaft 2 was operated as the counterflow shaft and after reversal of the shafts, shaft 2 was fired with natural gas with shaft 1 serving as the counterflow shaft for exhaust of the flue gases.

The combustion tests showed that coal dust in uniflow with hot air of a temperature of approximately 700° C., i.e., the temperature at the outlet opening 30, can be burned quite well and can produce a quality of the calcined lime which is comparable to quality produced with natural gas or other liquid or gaseous fuels. The heat combustion per ton of lime was practically the same regardless of whether coal dust or gaseous or liquid fuels were used.

Table 1 appended to the present specification shows a compilation of the analyses of different types of coal which were used for the combustion tests. In Table 2 there are shown analyses of calcined lime produced with the coal types shown in Table 1. As a comparison, there is also shown the analysis of lime produced in the same furnace but fired with natural gas.

When both shafts are fired with coal dust, then a proportioning unit in accordance with FIG. 4 should be used wherein the tube switches are installed in the dosing lines 16 of the fuel lances for switching of the fuel from one shaft to the other.

It should also be noted that the industrial and economic value of the method described was found to be quite significant because heat consumption in a shaft furnace was at least 30 percent less than in a rotating furnace equipped with a preheater which is also suitable for firing with coal dust.

It was unexpectedly shown that, when solid fuel is supplied, operation can be maintained without interruption even over longer operating periods when the mixture of the carrier medium and fuel is in a ratio of 0.2 to 0.8 $m^3$ of carrier medium per kg of fuel and preferably in a range between 0.45 to 0.70 $m^3$ of carrier medium per kg of fuel. Within this range there occur no deposits in the feed pipe 4 or in the fuel lances 3 and, additionally, there occurs hardly any abrasion of the pipe walls. The radius of curvature of the tubing immediately preceding the fuel lances 3 is on the order of at least 300 mm. Thus, the fuel lances 3 may be made of ordinary steel and they need not be insulated or cooled. The aforementioned range for the carrier medium—fuel mixture also applies with regard to different types of coal, or lignites, for example brown coal and bituminous coal. Also, the ash content may vary within a relatively wide range of between 4 to 25 percent.

The aforementioned advantages may also be achieved with the use of charcoal dust as fuel. However, charcoal does not need to be gasified in the described method. Consequently, no efficiency losses due to the gasification plant occur. Additionally, there results a complete utilization of the heating power of the charcoal for the combustion process and a considerable saving in investment whereby the lowest possible heat consumption can also be accomplished as in the case when utilizing gas or liquid fuel. As compared to calcination in rotating furnaces with or without preheaters, fuel savings of at least 25 to 50 percent can be accomplished in the method described. Calcining of limestone and similar mineral raw materials can therefore find considerable economic use in many countries.

Preferably charcoal dust is used in a finely ground form, e.g., with a granulation smaller than 90μ. The charcoal dust is introduced by means of a gaseous carrier medium as are the other fuels. However, a liquid carrier medium may also be used. Simple uncooled steel pipes may be used as well as steel pipes or fuel lances with an outer insulation and/or with a casing. In the operation of the shaft furnace, it is advantageous that the charcoal dust be introduced into the fill of the material to be calcined at a place where the temperature of the limestone to be calcined as well as the temperature of the fed-in combustion air is above the ignition temperature of the charcoal dust. Due to the uniform distribution of the outlet openings over the shaft cross-section, uniform distribution of solid fuel in the empty spaces of the fill is accomplished. Due to the arrangement of the outlet openings at the beginning of the calcining zone B, the by-products which result from the coal dust are completely utilized during combustion and consequently during calcining of the limestone or the like. The method according to the invention can be performed with a kiln having one shaft only. In a kiln having at least two shafts, the shafts are arranged in adjacent relationship and have a circular, oval or rectangular section. Also a kiln having two coaxial shafts can be used.

While specific embodiments of the invention have been shown and described in detail to illustrate the application of the inventive principles, it will be understood that the invention may be embodied otherwise without departing from such principles.

TABLE 1

| Characteristic Data of Coals for Tests in a Lime Shaft Furnace | | | | |
| --- | --- | --- | --- | --- |
|  | German Brown Coal | Greek Brown Coal | German Bituminous Coal | South African Bituminous Coal |
| Ash Content (%) | 3.66 | 15.17 | 20.0 | 13.3 |
| Moisture (%) | 10.0 | 11.75 | 1.0 | 9.1 |
| Volatile Components (%) | 45.41 |  | 8–10 | 22.3 |
| Sulfur (%) | 0.40 | 1.7 | 1.0 |  |
| Clean Coal (%) | 86.34 |  |  |  |
| Heating Power |  |  |  |  |
| (kcal/kg) | 5170 | 4170 | 6400 | 5960 |
| (kJ/kg) | 21700 | 17500 | 26880 | 25000 |
| Fineness (% <90 ym) | 70 | 71.4 | 93 | 77.2 |

TABLE 2

| | CALCINED LIME GRANULATION (Percent) | | | | | | | | |
| --- | --- | --- | --- | --- | --- | --- | --- | --- | --- |
| | NATURAL GAS FIRING | | FIRING WITH GERMAN BROWN COAL | | HEATING WITH GREEK BROWN COAL | | HEATING WITH GERMAN BITUMINOUS COAL | | SOUTH AFRICAN COAL |
| | 0–3 mm | >3 mm | 0–3 mm | >3 mm | 0–3 mm | >3 mm | 0–3 mm | >3 mm | 0–90 mm |
| $SiO_2$ + insolubles | 1.0 | 1.1 | 1.3 | 0.5 | 22.7 | 0.5 | 1.3 | 0.3 | |
| $Al_2O_3$ | 1.1 | 0.7 | 2.7 | 1.7 | 5.0 | 1.7 | 1.9 | 1.1 | |
| $Fe_2O_3$ | 0.4 | 0.6 | 1.6 | 0.3 | 1.7 | 0.4 | 0.7 | 0.6 | |
| CaO | 93.6 | 94.0 | 87.9 | 93.4 | 62.2 | 92.1 | 94.1 | 97.0 | |
| MgO | 2.4 | 2.4 | 2.7 | 1.2 | 1.7 | 4.6 | 0 | 0 | |
| $SO_3$ | | 0.085 | 2.8 | traces | 4.9 | 0.2 | 0.8 | 0.6 | |
| Calcining loss | 1.3 | 1.3 | 1.2 | 2.4 | 1.4 | 0.5 | 1.1 | 0.6 | 0.3–2.5 |

What is claimed is:

1. In a process for calcining limestone and similar raw materials in a uniflow regenerative shaft furnace having furnace shafts alternately operated as a calcining shaft and as a counterflow shaft, the improvement comprising: that said furnace is fired by solid fuel in fine particulate form which is supplied to the calcining shaft of said furnace through fuel supply means having fuel outlet openings which are all located generally at a common level in said furnace shafts; that said outlet openings are arranged to supply said fuel into said calcining shaft with a generally uniform distribution over the cross-sectional area of said shaft at which said fuel supply means are located; that the quantity of said fuel supplied is metered outside of said furnace and maintained generally constant with time; that said solid fuel is delivered through said outlet openings by means of a gaseous carrier medium; and that said fuel is fed into said calcining shaft at a point where the temperature of the material being calcined is above the ignition temperature of the solid fuel.

2. Apparatus for calcining limestone and similar raw materials comprising: a uniflow regenerative shaft furnace having furnace shafts alternately operated as a calcining shaft and as a counterflow shaft of said furnace; said furnace shafts being arranged to define a preheating zone and a calcining zone immediately adjacent each other, with the termination of said preheating zone and the commencement of said calcining zone lying in a common plane extending transversely to the longitudinal direction of said shafts; means supplying solid fuel in fine particulate form in the calcining shaft of said furnace, said solid fuel supply means comprising fuel lances suspended in said preheating zone defining fuel outlet openings in communication with said calcining shaft uniformly distributed across the cross-sectional area of said shaft and arranged to lie within a generally equivalent level in the vicinity of said common plane between said preheating zone and said calcining zone for each of said shafts; means for providing a gaseous carrier medium by means of which said solid fuel is transported to said fuel lances; metering means for supplying said solid fuel in a dosed quantity which is maintained generally constant with time; and switching means for switching the supply of fuel between said furnace shafts to alternately supply fuel to the furnace shaft operating as the calcining shaft.

3. A process according to claim 1, wherein said solid fuel is coal in fine particulate form.

4. A process according to claim 3, wherein said fuel is charcoal dust.

5. A process according to claim 4, wherein said charcoal dust is in finely ground form having a granulation less than 90µ.

6. A process according to claim 1, wherein there is provided at least 0.2 m3 of said gaseous carrier medium per kg of said solid fuel.

7. A process according to claim 1, wherein said gaseous carrier medium is provided within a range of about 0.2 to 0.8 m³ per kg of said solid fuel.

8. A process according to claim 7, wherein said gaseous carrier medium is provided within a range of between 0.45 to 0.70 m³ per kg of said solid fuel.

9. A process according to claim 1, wherein cooling air is provided in the shaft operating as the counterflow shaft.

10. Apparatus according to claim 2, wherein feed pipes are provided for delivering said solid fuel to said fuel lances and wherein curved transition members are provided between said feed pipes and said fuel lances, said transition members having an average radius of curvature of at least 300 mm.

11. Apparatus according to claim 2, wherein said fuel lances are uninsulated and uncooled steel tubes.

12. Apparatus according to claim 2, wherein said metering means comprise means for weighing said solid particulate fuel and bucket wheel sluice means for feeding said fuel.

13. Apparatus according to claim 12, wherein said bucket wheel sluice means comprise motor-driven bucket wheel sluices to control the rate of feed of said solid fuel.

14. Apparatus according to claim 2, wherein said means for providing a gaseous carrier medium operate to provide at least 0.2 m$^3$ of gaseous carrier medium per kg of solid fuel.

15. Apparatus according to claim 14, wherein said gaseous carrier medium is provided within a range of about 0.2 to 0.8 m$^3$ per kg of solid fuel.

16. Apparatus according to claim 15, wherein said gaseous carrier medium is provided within a range between 0.45 to 0.70 m$^3$ of carrier medium per kg of solid fuel.

17. Apparatus according to claim 2, further comprising blower means for cooling the fuel lances located in the shaft operating as the counterflow shaft.

* * * * *